WILLIAM J. RUSSELL INVENTOR

WILLIAM J. RUSSELL INVENTOR

United States Patent Office 3,417,305
Patented Dec. 17, 1968

3,417,305
THERMALLY RESPONSIVE CONTROL CIRCUIT WITH MANUAL RESET
William J. Russell, Malvern, Pa., assignor to Robertshaw Controls Company, Richmond, Va., a corporation of Delaware
Filed Oct. 23, 1965, Ser. No. 503,995
18 Claims. (Cl. 318—473)

ABSTRACT OF THE DISCLOSURE

An alternating current bridge circuit output signal which varies in accordance with a temperature responsive resistance directly controls the operation of a SCR. The SCR controls the operation of a relay which in turn operates to connect and remove resistance from the bridge circuit to determine the set point and reset point temperatures for the bridge circuit. The resistance change introduced by the relay operation is selected to place the reset point temperature beyond the temperature range the bridge circuit is expected to sense so the circuit will not automatically reset. Provision is made to manually reset the bridge circuit.

---

The invention presented herein relates generally to thermally responsive electronic control systems, and, more particularly to such systems which are useful in providing thermal protection of electric motors and are manually reset.

In many cases it is necessary to protect the windings of motors from damage due to high temperatures created by excessive current flow in the windings. Some motors, such as those used in compressors, refrigeration or air-conditioning equipment, can experience a rate of temperature rise as high as 50° F. per second or more. This has required the use of electronic overload protective systems to provide the speed of response needed when such rates of temperature rise are encountered to terminate energization of motors before the windings are damaged by excessive temperature.

A known electronic overload protective system disclosed in the U.S. patent application of Egils H. Evalds, Ser. No. 503,996, filed Oct. 23, 1965, capable of providing such protection includes a phase sensitive switch means having an "on" and "off" mode of operation determined by the phase and magnitude of a signal applied to the input of the switch means. The input signal for the switch means is obtained from the output of a bridge network. An A.C. bridge network is used which provides a signal of one phase when unbalanced in one direction and a signal of the opposite phase when unbalanced in the opposite direction. It includes a first bridge circuit connected in response to the "on" mode of operation of the switch means to provide the network output and a second bridge circuit connected in response to the "off" mode of operation of the switch means. A single temperature responsive resistive sensor is used which is placed in the motor windings to respond to the temperature at the windings and is common to the first and second bridge circuits. The phase sensitive switch means includes a relay having two sets of electrical contacts which are in one position corresponding to the "on" mode of operation of the switch means and in another position corresponding to the "off" mode of operation of the switch means. The first set of contacts is used to control the circuitry for energization of the motor winding. The first set of contacts causes current to flow through the motor winding when they are in the position corresponding to the "on" mode of operation of the switch means, and, of course, cause the current flow to be terminated when in the other position which corresponds to the "off" mode of operation of the switch means. The second set of contacts determines which of the two bridge circuits are connected to provide the control signal for the phase sensitive switch means. Thus, the second set of contacts when in the position corresponding to the "on" mode of operation of the switch means, causes the first bridge circuit to be connetced to provide the input signal to the phase sensitive switch means and when in the other position which corresponds to the "off" mode of operation of the switch means, causes the second bridge circuit to be connected to provide the input signal to the phase sensitive switch means.

The first bridge circuit when connected to provide the input signal for the phase sensitive switch means provides a signal of the phase and magnitude which maintains said switch means in the "on" mode of operation so long as the temperature sensed by the temperature responsive resistive sensor is below a selected safe operating temperature for the motor windings. Once the safe operating temperature is exceeded the signal produced by the first bridge circuit is of the phase and magnitude required to cause the phase sensitive switch means to change from the "on" mode of operation to the "off" mode of operation. The relay responding to this "off" mode positions the first set of contacts to terminate the flow of current to the motor and positions the second set of contacts to connect the second bridge circuit for supplying the input signal for the phase sensitive switch means. The second bridge circuit provides a signal for the phase sensitive switch means which maintains the switch means in the "off" mode until the temperature of the motor winding as sensed by the sensor drops to a predetermined reset temperature. Once the reset temperature is reached the signal produced by the second bridge circuit is of the phase and magnitude needed to cause the phase sensitive switch means to change from the "off" mode of operation to the "on" mode of operation. This, of course, causes the relay to position the two sets of contacts to cause current to again flow through the motor windings and again connect the first bridge circuit to provide the input signal to the phase sensitive switch means. The control is thus in condition to again detect an unsafe temperature at the motor winding.

The protective circuitry described is automatically reset following detection of an unsafe temperature at the motor windings. The circuit fails to satisfy all applications as a motor protector since there are cases where manual reset is needed. In addition, it is desirable when manual reset is used to have a visual indication given to indicate the need for reset.

Accordingly, it is an object of this invention to provide a thermally responsive control system which is manually reset and when needed provides a visual indication of the need for reset.

In the case where a visual indication of the need for manual reset is provided it is an object too of this invention to provide such indication at a point remote from the other circuit elements with a minimum of cost and providing it in such a way that the manual reset action can be initiated at a point near the visual indication if desired.

Another object of the invention is to provide manual reset which is effective only if the temperature responsive sensor is responding to a temperature which is at least a predetermined amount below the set point temperture for the control circuit.

A thorough understanding of the invention and details of the manner in which these and other objects are attained in accordance with the invention may be obtained by reference to the remaining portion of the specification and the following drawings which form a part thereof, and wherein.

Figure 1:
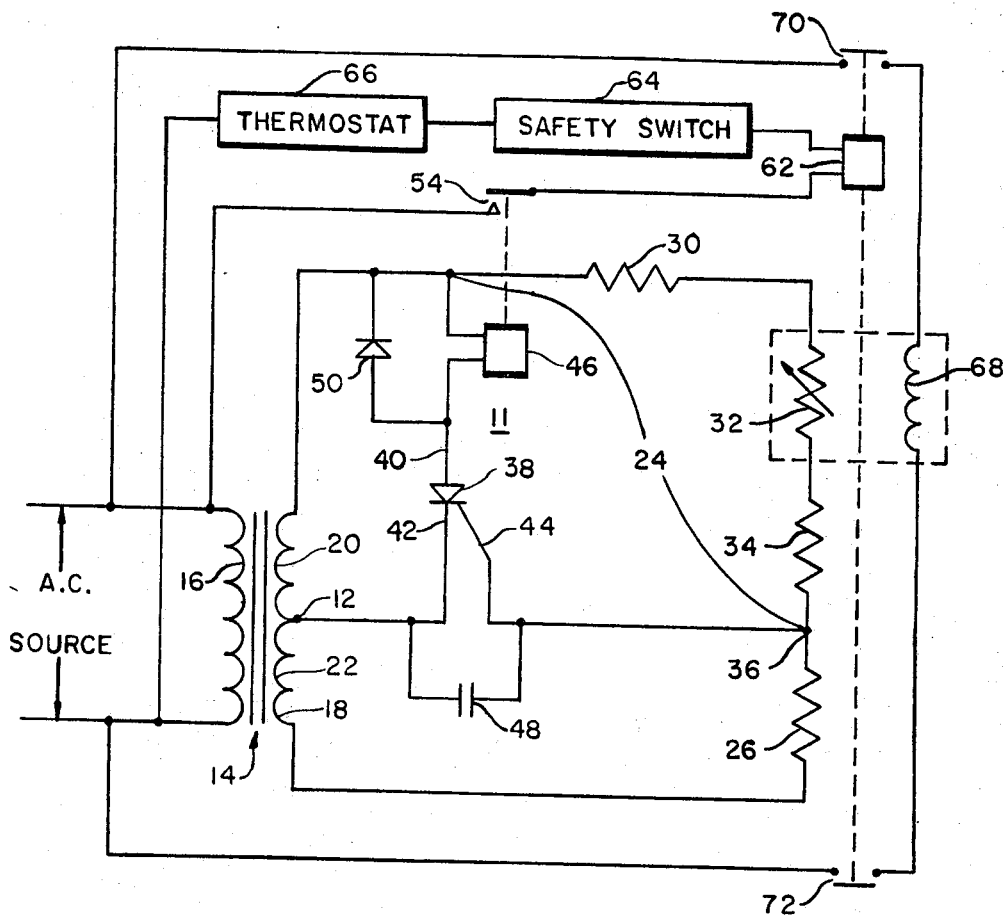
FIGURE 1 is a schematic diagram of a motor protector circuit.

FIGURE 1 which is a simplification of the circuitry disclosed in U.S. patent application Ser. No. 503,996, referred to earlier, shows a four-leg alternating current bridge circuit with a phase sensitive switch means 11 connected to respond to the bridge output. The bridge circuit includes a transformer 14 with its primary winding 16 connected to an alternating current source and its secondary winding 18 formed with a tapped connection 12. The upper and lower portions of the secondary winding 18 are used as legs 20 and 22, respectively, of the bridge circuit. Two legs or branches 24 and 26 are connected in series by a common connection 36. The series combination of legs 24 and 26 is connected across the secondary winding 18 to complete the bridge circuit. The legs 24 and 26 are formed from resistive elements. Leg 24 is connected to leg 20 and includes three series connected resistance elements 30, 32 and 34. Resistance element 32 is shown as variable since it is temperature sensitive and is used as the sensor for the bridge. It is shown positioned with a motor winding 68. Dotted lines are drawn around the sensor 32 and motor winding 68 to indicate that the sensor 32 is positioned to respond to the temperature at the winding 68. The leg 26 is formed from a single resistor which is connected at one end to leg 24 by connection 36 and at the other end to leg 22.

The output of the bridge circuit appears between the tapped connection 12 and the connection 36 which is common to the branches or legs 24 and 26. Since only the temperature responsive resistance element 32 of the bridge circuit is variable, it is apparent that the output voltage appearing between points 12 and 36 will vary in magnitude and phase with changes in the resistance presented by element 32. For purposes of illustration, this variation in magitude and phase and other aspects regarding the operation of the circuit will be explained by considering the tap connection 12 to be at the electrical center of the secondary winding 18. If leg 24 then presents the same resistance as leg 26 the output voltage for the bridge, i.e., the voltage between connections 12 and 36, will be zero. When leg 24 presents less resistance than leg 26, a voltage difference is present between connections 12 and 36 which when measured at connection 36 with respect to connection 12 is in phase with the voltage present between the upper end of secondary winding 18 and connection 12. This is readily understood if the extreme case is considered, i.e., assume the resistance of leg 24 is zero. In such as case the connection 36 will be electrically the same as the upper end of secondary winding 18 and will therefore be in phase with and have the same amplitude as the voltage appearing across the upper half of the secondary winding 18 or leg 20. The maximum amplitude of the alternating voltage appearing between connections 36 and 12 will decrease as resistance is introduced between the upper end of winding 18 and connection 36. Similarly, when leg 24 presents a resistance which is greater than leg 26, the voltage at connection 36 as measured with respect to connection 12 is in phase with the voltage measured at the lower end of secondary winding 18 with respect to connection 12 and therefore 180° out of phase with the voltage measured between the upper end of secondary winding 18 and connection 12.

And as before, the maximum amplitude of the alternating voltage appearing between connections 36 and 12 will vary directly with the amount of such unbalance present between the resistance in leg 24 and the resistance in leg 26.

It would not be possible to use only the magnitude of the output voltage of the bridge circuit as an indication of when the set point temperature is reached since a voltage of a given magnitude can be obtained when the resistance of leg 24 is greater than the resistance of leg 26 and when it is less than the resistance of leg 26. In order that the circuit can be used to initiate a corrective action, as in the case of its use in a motor protector circuit, it is necessary that this ambiguity be resolved. It is therefore necessary that the circuit 11 which is to respond to the bridge output require an input signal which is above a certain level and of a certain phase or polarity with relation to some reference voltage, i.e., the device or circuit responding to the bridge output must be phase sensitive. A phase sensitive electronic switch device, such as a thyristor, i.e., a semiconductor device having control characteristics similar to those of thyratron tubes, or a circuit equivalent thereto, connected to control an electric translating device such as a relay provides the phase sensitive switch means 11 responsive to the bridge circuit output. A silicon controlled rectifier (SCR) is one phase sensitive electronic switch that has been found to be satisfactory. A silicon controlled rectifier (SCR), as illustrated by SCR 38 in FIGURE 1, has three electrodes, an anode, cathode and gate, which are identified by numerals 40, 42 and 44, respectively. A silicon controlled rectifier (SCR) is a semiconductor device which, as the name indicates, conducts current primarily in one direction. However, unlike the conventional rectifier the SCR will not present a low internal resistance to current flow in the forward direction unless the anode voltage exceeds a certain minimum voltage called the forward breakdown voltage.

FIGURE 1 shows an SCR 38 connected to respond to the bridge circuit output with the output of the SCR 38 connected to an electric translating device, such as electric relay 46. More specifically, the SCR 38 is connected with anode 40 electrically connected to the upper end of the secondary winding 18 via the winding of electric relay 46. Cathode 42 is connected to the tapped connection 12 and gate 44 is connected to the output terminal 36 of the bridge circuit. A capacitor 48 is connected between gate 44 and cathode 42 to provide a low impedance path for any high voltage pulses which may appear in the A.C. voltage applied to the bridge and thus prevents the SCR 38 from being damaged by such pulses.

The transformer 14 provides 24 volts A.C. across the secondary winding 18 so there are 12 volts A.C. applied between the anode 40 and cathode 42. The 12 volts alone will not cause the SCR 38 to conduct in the forward direction. This voltage applied to the anode 40, however, exceeds the minimum forward breakdown voltage if the gate 44 has a voltage applied to it which is positive with respect to the cathode 42 and is applied at the same time that the forward voltage is present at the anode 40. The nominal gate voltage required is .6 v. at 25° C. and decreases slightly at a substantially uniform linear rate with an increase in temperature. When the forward breakdown voltage required is thus modified by such a gate signal, the high internal resistance of the device changes to a very low value to permit a high current to flow through the device. Once the SCR is triggered by the gate signal to the "on" mode the current flow is independent of gate voltage or current and the SCR remains in the high conduction "on" mode until the anode current is reduced to a level below that required to sustain conduction. The SCR is thus phase sensitive since the anode-cathode voltage and gate-cathode voltage must be of the same polarity to place the SCR in the "on" mode.

As has been mentioned, the voltage presented between the gate 44 and cathode 42 is in phase with the voltage between anode 40 and cathode 42 so long as the resistance in leg 24 is less than the resistance in leg 26. The amplitude of the gate to cathode voltage decreases, of course, as the resistance in leg 24 increases and reaches zero when the resistance in leg 24 equals the resistance in leg 26. When the anode to cathode and gate to cathode voltages are in phase the SCR is placed in the "on" mode for at least a portion of each positive half-cycle. During the negative half-cycle only a slight current flows through the SCR. As previously mentioned, the gate voltage, however, must be at least .6 v. (at 25° C.) to have the SCR turned "on." Therefore, when the temperature sensitive resistance 32 increases to the point where the amplitude of the gate to cathode voltage drops below .6 v. the SCR switches to the "off" mode until the gate to cathode voltage again reaches .6 v. and is in phase with the anode to cathode voltage. The temperature sensed by the sensor 32 at which the gate to cathode voltage drops below .6 v. is the set point temperature for the circuit.

The phase sensitive switch means 11 which has its mode of operation changed when the set point temperature is reached is used to terminate the thermal input causing the temperature rise as sensed by the sensor 32. In the case of the circuit being used to protect the windings of a motor from damage due to excessive temperatures caused by the windings drawing too much current, the phase sensitive means 11 is used to control the flow of current in the motor winding. Thus, upon detection of the set point temperature, which corresponds to the selected unsafe temperature for the motor winding, the phase sensitive means 11 changes from the "on" mode to the "off" mode of operation. The relay 46 has a set of contacts 54 which are closed when relay 46 is energized, i.e., when the SCR 38 is in the "on" mode of operation. Depending upon the current rating of the motor being protected, the contacts 54 can be connected to control the current flow to the motor winding directly or can be connected to control the energization of a magnetic starter which in turn controls the energization of the motor winding.

For purposes of illustrating the use of the bridge circuit and the phase sensitive means 11 for protecting a motor winding, such circuitry is shown with the sensor 32 positioned to sense the temperature at the windings 68 of a compressor motor for a refrigeration system. The contacts 54 are connected as part of a series circuit including the winding of a magnetic starter 62, safety switch 64 and thermostat 66. This series circuit is connected to the A.C. source. The safety switch 64 may be a switch responsive to too high and too low refrigerant pressures produced by the refrigerant compressor (not shown) driven by a motor of which winding 68 is a part. The thermostat 66 of course, functions in response to the temperature to be established by the refrigerating system. The magnetic starter 62 operates two switches 70 and 72. The switches 70 and 72 are in series with the motor winding 68 and therefore control the flow of current from the A.C. supply to the motor winding 68. The temperature responsive resistance sensor 32 is embedded in the winding 68 to provide good thermal response to the temperature of the winding 68.

Normally, the motor winding 68 operates at a temperature which is below the set point temperature. The sensor 32 for the circuit described has a positive coefficient of resistance so the resistance of leg 24 is less than the resistance of leg 26 when the temperature sensed is below the set point temperature. Under such conditions the output of the bridge circuit between 36 and 12 is above .6 v. and in phase with the voltage appearing between the anode 40 and cathode 42 of the SCR 38. This, of course, causes the SCR 38 to be placed in the "on" mode, i.e., the SCR is conducting for at least a portion of each cycle. With the SCR 38 in the "on" mode the relay 46 is energized causing the contacts 54 to be closed.

Assuming that the thermostat 66 and the safety switch 64 are closed, the closure of contacts 54 is effective to cause the magnetic starter 62 to be energized closing switches 70 and 72. Closure of switches 70 and 72 connects the winding 68 to the A.C. source. Should the load on the motor cause the current through the winding 68 to increase to the point where the temperature of winding 68 reaches the set point temperature the output voltage of the bridge circuit will drop below .6 v. causing the phase sensitive switch means 11 comprising the SCR 38 and relay 46 to be placed in the "off" mode. De-energization of the relay 46 causes contacts 54 to open which in turn causes the magnetic starter 62 to be de-energized allowing switches 70 and 72 to open to terminate the current flow to the motor winding 68 and thus terminate the thermal input to the windings 68.

The bridge circuit connected as described to control the operation of the SCR 38 has a set point temperature and reset temperature which are substantially the same. In addition, the circuit is reset automatically. Thus, once the circuit has responded to the set point temperature to place the SCR 38 in the "off" mode of operation, it is only necessary that the temperature sensed by the sensor 32 drop to the reset temperature to cause the bridge circuit output to change in phase and magnitude to place the SCR 38 in the "on" mode of operation. With a circuit operating in this manner the circuit to the motor winding 68 could be energized prematurely. Such a circuit will not satisfy the applications where it is desirable that a system utilizing the motor being protected be checked before the motor is again energized. It is necessary therefore that the circuit as described to this point not reset itself automatically, but must be modified to require manual resetting by an operator. Further, in a number of such applications it is also desirable that such resetting be prevented if the motor winding has not cooled to a preselected temperature level.

Figure 2:
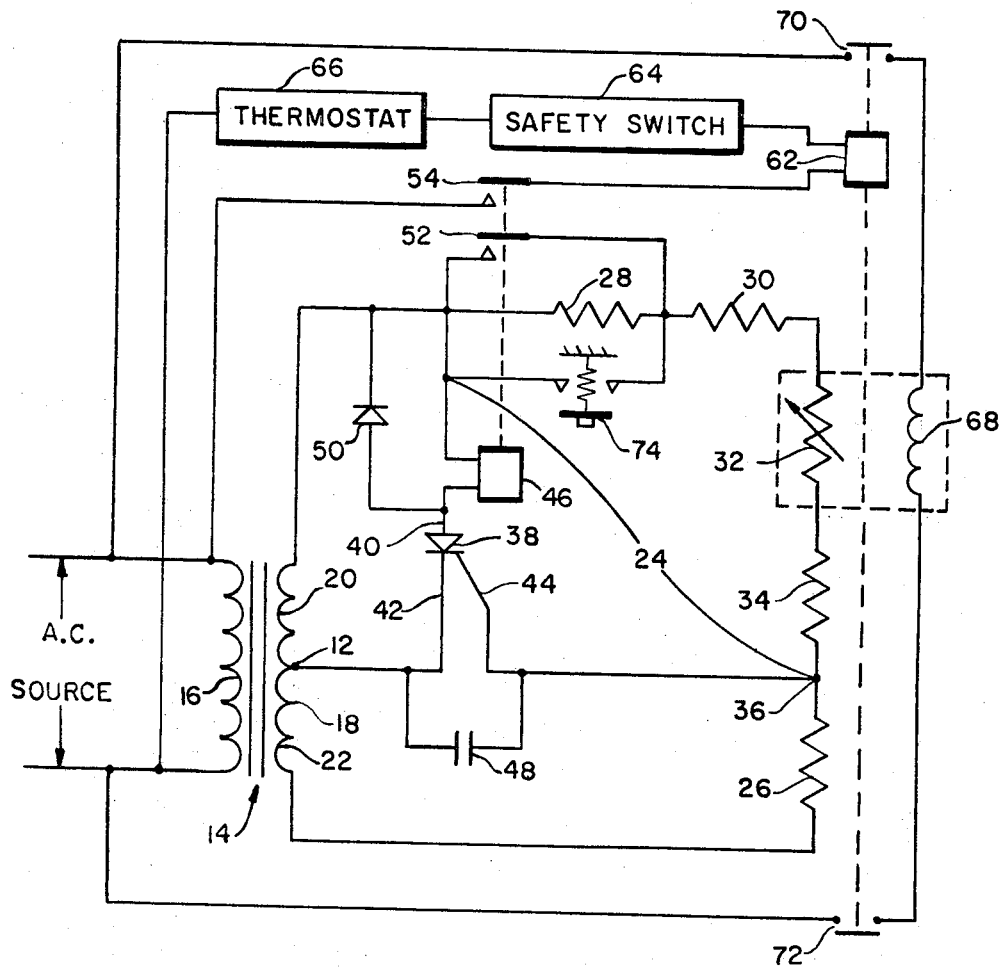
FIGURE 2 is a schematic diagram of a motor protector circuit embodying the invention presented herein.

The invention presented herein resides in the modifications made to the circuitry shown in FIGURE 1 which provide a motor protector circuit which must be manually reset. FIGURE 2 is one embodiment of such modification. FIGURE 2 is the same as FIGURE 1 except that additional circuitry has been added to leg 24. The additional circuitry is connected between the resistance element 30 and the upper end of leg 20 and includes a resistive element 28, a set of contacts 52 operated by relay 46 which are connected to control a first short circuit for resistive element 28 and a second short circuit for resistive element 28 under the control of a normally open, manually operated switch 74. The contacts 52 are open when relay 46 is de-energized and are closed when relay 46 is energized.

It can be seen that the circuitry in FIGURE 2 is electrically the same as that shown in FIGURE 1 when the phase sensitive switch means 11 is in the "on" mode since contacts 52 are then closed shorting out the resistance 28. Thus, the circuitry of FIGURE 2 operates in the same manner as the circuit disclosed in FIGURE 1 when in the "on" mode of operation, i.e., when the temperature at the winding is below the bridge set point temperature. When the sensor 32 responds to the set point temperature, the SCR 38 changes from the "on" mode to the "off" mode causing the relay 46 to be de-energized. Contacts 52 and 54 therefore open. The opening of contacts 54 causes the current flow to the motor 68 to be terminated since the contacts 54 control the magnetic starter 62 which is de-energized causing contacts 70 and 72 connected in series with the motor winding 68 to open. The opening of contacts 52 removes the short circuit around the resistor 28 and in effect connects the phase senstive switch means 11 to a second bridge circuit. The resistor 28 adds to the resistance in leg 24 causing tre reset temperature for the second bridge circiut to be lower than the reset temperature for the bridge circiut which does not include resistor 28, i.e., the bridge circuit formed when resistance 28 is shorted out. Resistance 28 is made large enough so the reset temperature of the second bridge circuit is well below any temperature sensor 32 will encounter. It is therefore necessary that the resistance of leg 24 be reduced to cause the signal presented across the gate 44 and cathode 42 to be of the necessary phase and magnitude to place the SCR 38 in the "on" mode of operation to cause contacts 52 to close completing the short circuit around resistance 28. The resistance presented by leg 24 can be readily reduced by shorting out a portion of the resistance present in the leg. In FIGURE 2 this is accomplished by the second short circuit around resistance 28 completed when switch 74 is closed. Switch 74 is manually operated making it possible for the system using the motor protector to be inspected, if desired, before resetting the motor protector circuit.

The resistance 28 can take the form of an incandescent lamp or bulb to provide a visual indicator for the circuit. Thus when the SCR is in the "on" mode the lamp 28 will not be illuminated since it is shorted out via the relay contacts 52. This short circuit is removed when the relay becomes de-energized due to the SCR being placed in the "off" mode by the sensor 38 responding to the set point temperature. Current flow through the bulb 28 is then sufficient to illuminate it. Illumination of bulb 28, of course, indicates the need for a reset action to place the protector circuit in condition for again sensing the set point temperature. The ease with which the bulb 28 and reset switch 58 can be located at a point remote to the remainder of the circuit is obvious.

Figure 3:
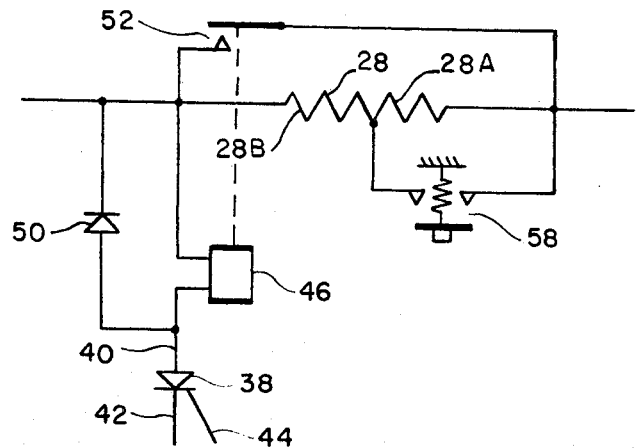
FIGURE 3 is a schematic diagram showing a modification of the circuitry of FIGURE 2.
Figure 4:
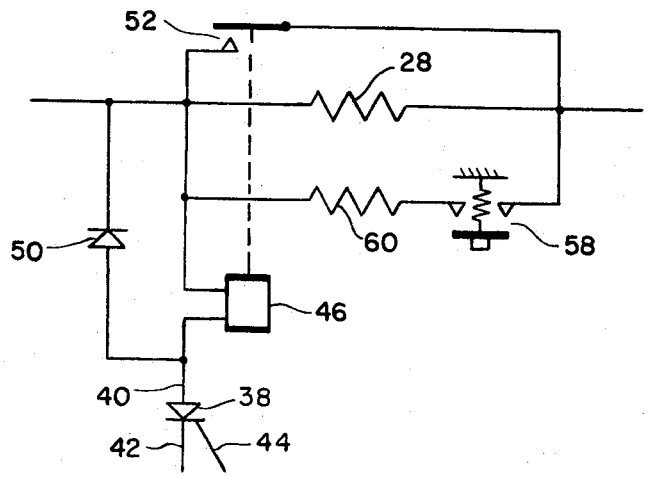
FIGURE 4 is a schematic diagram showing another modification of the circuitry of FIGURE 2.

The manual reset provided by the circuit modifying arrangement shown in FIGURE 2 is satisfactory provided it is not necessary that sensor 32 be at a temperature which is some predetermined amount or more below the set point temperature before a reset action is completed. However, in some applications it is desirable that the temperature at the sensor be a certain number of degrees below the set point temperature before a reset action be completed. The circuit modifications shown in FIGURES 3 and 4 provide manual reset with any reset attempt being ineffective if the temperature at the sensor 32 is not at least a predetermined temperature below the set point for the circuit. The circuits shown in FIGURES 3 and 4 are similar in that the operation of the reset switch 58 is effective to reduce the resistance presented in the circuit as measured between the ends of resistance 28. As in FIGURE 2, resistance 28 is chosen to be great enough so that reduction of the resistance presented by resistance 32 sensing the lowest temperature expected to be encountered in its environment is not sufficient to place the SCR 38 in the "on" mode. In FIGURE 3 a circuit branch including a switch 58 of the type as described in connection with FIGURE 2 is used to short out a portion 28a of resistance 28 when the switch 58 is moved to the closed position. The remainder of resistance 28, i.e., portion 28b, remains as a part of the resistance presented by leg 24 of the bridge circuit 10. The amount of resistance presented by portion 28b is sufficient to require the sensor 32 to be sensing a temperature which is a predetermined number of degrees or more below the set point temperature for the circuit before the SCR 38 will be placed in the "on" mode upon closure of switch 58. The closure of contacts 52 due to energization of relay 46 caused by the SCR 38 being placed in the "on" mode is effective to short out the entire resistance 28 and thus reset the circuit for detection of the set point temperature. In FIGURE 3 the portions 28a can be an incandescent lamp or bulb if a visual indication is needed. As in FIGURE 2, the bulb and switch 58 can readily be located at a remote point.

In FIGURE 4 a switch 58 of the type described in connection with FIGURES 2 and 3, is connected in series with a resistance 60 and the combination connected in parallel with resistance 28. As in FIGURE 2 and FIGURE 3, resistance 28 is chosen to be great enough so that reduction of the resistance presented by sensor 32 sensing the lowest temperature to be encountered in its environment is not sufficient to place the SCR 38 in the "on" mode. When switch 58 is moved to the closed position in an effort to reset the circuit, resistance 60 is connected in parallel with resistance 28. The combined resistance of resistance 28 and 60 is less than that of resistance 28 alone and is such as to require the sensor 32 to be sensing a temperature which is a predetermined number of degrees or more below the set point temperature for the circuit before the SCR 38 will be placed in the "on" mode upon closure of switch 58. As is the case for the circuits of FIGURES 2 and 3, contacts 52 will close in response to energization of relay 46 by the current flow through SCR 38 to short out the circuit modifying resistance and thus reset the circuit for detection of the set point temperature as determined by the first bridge circuit. The resistance 28 can be in the form of an incandescent lamp or bulb to provide a visual indication of the need for a reset action. Remote placement of the reset switch 58 and the lamp can be accomplished with two wires as is the case for FIGURES 2 and 3 provided resistance 60 is located with the switch 58. However, even if the resistance 60 is located with the other circuitry, the remote reset and indication can be provided with only three wires.

As has been mentioned, the gate to cathode voltage needed to fire an SCR is about .6 v. at 25° C. and decreases at a substantially linear rate with an increase in the temperature of the SCR. If the circuit did not provide compensation for this change in the gate voltage, the set point temperature would rise with an increase in SCR ambient temperature, i.e., the resistance increase in the sensor 32 needed to place the SCR in the "off" mode would increase as the SCR ambient temperature increased. By providing an incremental increase in the resistance in leg 24 as determined by the ambient temperature for SCR 38, it is possible to compensate for this change in the set point. The resistance 30 in leg 24 provides this compensation and is positioned to respond to the ambient temperature of the SCR 38. It is made from the same wire as sensor 32 and therefore provides an increase in resistance with an increase in temperature at the SCR 38.

It will be noted that a diode 50 is shown connected in parallel with the relay 46 in each of the circuits shown in the drawings. When the SCR 38 is in the "on" mode of operation it is conducting for only a portion of each cycle. Thus, when the anode 40 is negative with respect to the cathode 42 there is essentially no current flow through the SCR 38. The operation of the electric relay 46 is improved by connecting the diode 40 in parallel with the winding of the relay. The impedance presented by the relay is inductive and therefore tends to keep the current flowing. This inductive characteristic is utilized by connecting the diode so the current flow through the inductance will continue in the same direction beyond that portion of the cycle when the SCR 38 is conducting. With this arrangement relay 46 will drop out during the off portion of each cycle.

Figure 5:
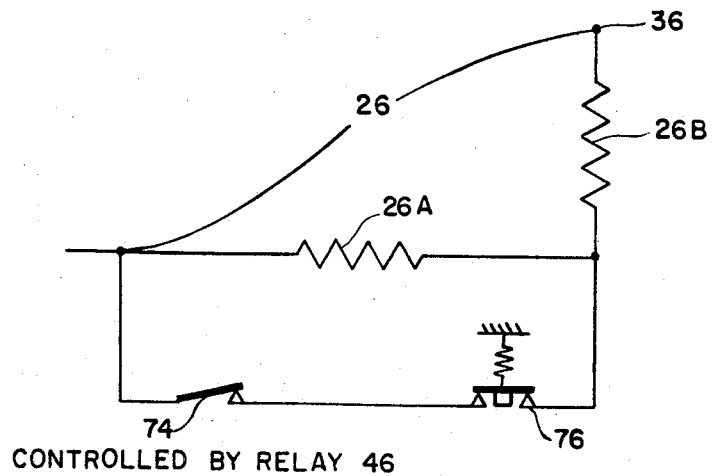
FIGURE 5 is a schematic diagram showing a modification of the circuitry of FIGURE 1.

It will be apparent to those skilled in the art that the circuit modifying portion of the bridge circuit network providing the two bridge circuits could be applied to leg 26 rather than leg 24 as shown in FIGURES 2, 3 and 4. In such a case, however, resistance of leg 26 would have to be decreased when the SCR 38 was placed in the "off" mode in response to the sensor 32 responding to the set point temperature of the circuit. Thus, the circuit shown in FIGURE 1 can be modified by changing leg 26 as shown in FIGURE 5. A set of contacts 74 under the control of relay 46 are used. The contacts 74 are in the open position when relay 46 is energized and are in the closed position when relay 46 is de-energized. The contacts are connected in series with a normally closed, manually operated switch 76 and are connected to short out a portion of the resistance presented in leg 26 when both are in the closed position. Resistors 26a and 26b are shown connected in series to provide the resistance for leg 26 needed to provide the desired set point for protecting the motor winding 68 from damage due to high temperatures. Resistance 26a is shown shorted out via the relay contacts 74 and switch 76. This is the condition of leg 26 when the relay 46 is de-energized, i.e., when the SCR 38 is in the "off" mode of operation. The resistance presented by resistor 26b is selected to be too small to cause the bridge circuit then presented to have an output of proper phase and magnitude to place the SCR 38 in the "on" mode for any temperature expected to be encountered by the sensor 32. If the sensor 32 is responding to a temperature which is safe for windings 68, it is only necessary for switch 76 to open to add resistance 26a to leg 26 and thus present the bridge circuit used for detection of an unsafe temperature at the windings 68. Since the temperature sensed at the windings 68 by sensor 32 is below the set point for the bridge circuit thus presented, the bridge circuit will present an output of the proper phase and magnitude to cause the SCR 38 to be placed in the "on" mode. This causes the relay 46 to be energized placing the contacts 74 in the open position. Switch 76 returns to its normally closed position when released and the resistor 26a remains as an effective part of leg 26 since relay contacts 74 are held open by the energized relay 46. The motor protector circuit provided by the modification shown in FIGURE 5 is thus like the circuit of FIGURE 2 in that it provides manual reset.

Figure 6:
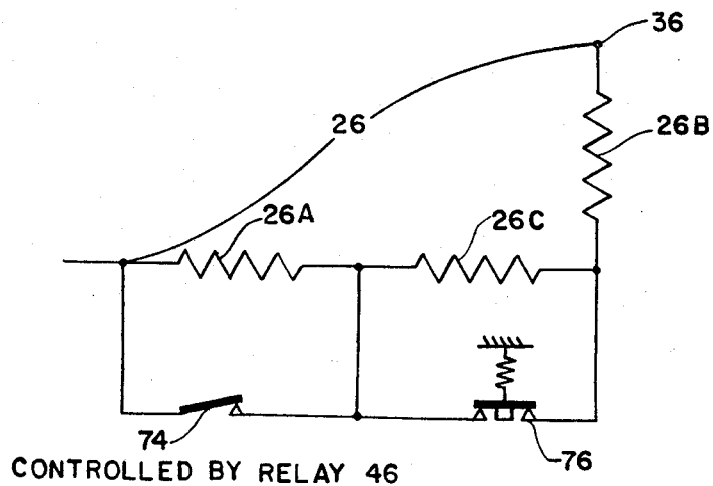
FIGURE 6 is a schematic drawing showing another modification of the circuitry of FIGURE 1.

The circuit of FIGURE 1 with leg 24 as modified by the circuitry of FIGURE 3 provides manual reset and requires the temperature of the motor winding 68 to be a predetermined number of degrees below the set point temperature as determined by the bridge with resistance 28 shorted out. The circuit of FIGURE 1 can have the leg 26 modified as shown in FIGURES 6 to provide a circuit with the same operating features as mentioned for FIGURE 1 as modified per FIGURE 3. Resistors 26a, 26b and 26c are connected in series. This series combination is connected between the lower end of secondary winding 18 and connection 36 in place of the resistance 26. As in FIGURE 5, the relay 46 includes contacts 74 which close when relay 46 is de-energized and are opened when relay 46 is energized. Contacts 74 are used to control a short circuit around resistance 26a. A normally closed switch 76 of the same type as that described in connection with FIGURE 5 is used to control a short circuit around resistance 26c. When the SCR 38 is in the "on" mode resistance 26c is shorted out and contacts 74 are open so resistance 26a and 26b are present in leg 26 to present the bridge circuit used for detection of an unsafe temperature at the windings 68. Assume the motor winding 68 reaches the unsafe temperature which is the set point for the bridge circuit. The output of the bridge circuit is then of the phase and magnitude needed to cause the SCR 38 to be placed in the "off" mode of operation. This de-energizes relay 46 causing contacts 74 to close shorting out resistance 26a. The resistance then presented in leg 26 is merely resistance 26b which is selected to be too small to cause the bridge circuit then presented to have an output of the proper phase and magnitude to place the SCR 38 in the "on" mode for any temperature expected to be sensed by sensor 32. The circuit is reset by opening switch 76 to add resistance 26c in series with resistance 26b. The addition of resistance 26c to leg 26 requires that sensor 32 respond to a temperature which is below the temperature sensed placing the SCR 38 in the "off" mode in order for the SCR 38 to be placed in the "on" mode once again. This required reset temperature is dependent on the resistance of resistor 26c. Until the temperature sensed by sensor 32 reaches the required reset temperature actuation of switch 76 is ineffective to reset the circuitry for detection of an unsafe temperature at the motor windings 68.

It will be apparent that various changes may be made in the circuitry herein described without departing from the scope of the invention as defined in the appended claims.

What is claimed is:

1. In a temperature responsive control circuit, the combination comprising:

a phase sensitive switch means having an input and output, said switch means having a first and second mode of operation dependent upon the phase and magnitude of a signal to said input, an A.C. bridge network having an output signal applied to said switch means input, said network including a first bridge circuit providing said network output signal in response to said first mode of operation of said switch means and a second bridge circuit providing said network output signal in response to said second mode of operation of said switch means, a temperature responsive sensor common to said first and second bridge circuits, said sensor upon sensing a first temperature when said first bridge circuit is providing said network output signal causes said network output signal to be of the proper phase and magnitude to cause said switch means to change from said first mode to said second mode and said sensor when said second bridge circuit is providing said network output signal causes said output signal to be of the proper phase and magnitude to cause said switch means to change from said second mode to said first mode only upon sensing a second temperature which is outside of the range of temperatures expected to be encountered by said sensor when said switch means is in said second mode, and manually operated means for modifying said bridge network when said switch means is in said second mode to cause said bridge network to provide an output signal of the proper phase and magnitude to place said switch means in said first mode of operation.

2. The temperature responsive control circuit of claim 1 wherein said manually operated means is effective to cause said bridge network to provide an output signal of the proper phase and magnitude to place said first mode of operation only if said sensor is responding to a temperature which is at least a predetermined number of degrees from said first temperature.

3. In a temperature responsive control circuit, the combination comprising:

a phase sensitive switch means having an input and output, said switch means having an "on" and "off" mode of operation dependent upon the phase and magnitude of a signal applied to said input, an A.C. bridge network having an output signal applied to said switch means input, said network including a first bridge circuit providing said network output signal in response to said "on" mode of operation of said switch means and a second bridge circuit providing said network output signal in response to said "off" mode of operation of said switch means, a temperature responsive sensor common to said first and second bridge circuits, said sensor upon sensing a first temperature when said first bridge circuit is providing said network output signal causes said output signal to be of the proper phase and magnitude to cause said switch means to change from said "on" mode to said "off" mode and said sensor when said second bridge is providing said network output signal causes said network output signal to be of the proper phase and magnitude to cause said switch means to change from said "off" mode to said "on" mode, only upon sensing a second temperature which is outside of the range of temperatures expected to be encountered by said sensor when said switch means is in said "off" mode, and manually operated means for modifying said bridge network when said switch means is in said "off" mode to cause said bridge network to provide an output signal of the proper phase and magnitude to place said switch means in said "on" mode of operation.

4. The temperature responsive control circuit of claim 3 wherein said second temperature is lower than said first temperature.

5. The temperature responsive control circuit of claim 3 wherein said manually operated means causes said bridge network to provide an output signal to place said switch means in said "on" mode of operation only if said sensor at the time said manually operated means is operated is responding to a temperature which is at least a predetermined number of degrees from said first temperature.

6. In a temperature responsive control circuit, the combination comprising:

electronic switch means having an input and output, said switch means having one mode of operation when said input is supplied with a gating signal and having a second mode of operation when said input is not supplied with a gating signal, an A.C. energized bridge circuit connected to said switch means and having an output signal applied to said switch means input, said bridge circuit including a resistive sensor the resistance of which varies with the temperature sensed, causing the said bridge output signal to change, and resistive circuit modifying means connected to said bridge circuit in accordance with the mode of operation of said switch means, said circuit modifying means including a portion thereof presenting one magnitude of resistance in response to said one mode of operation of said switch means causing said bridge circuit to provide said gating signal when the temperature sensed by said sensor is less than a first temperature and presenting a different magnitude of resistance in response to said second mode of operation of said switch means causing said bridge circuit to provide said gating signal only when the temperature sensed by said sensor is less than a second temperature, the difference between said first and second temperature being determined by the difference between said one magnitude of resistance and said different magnitude of resistance, said second temperature being less than any temperature expected to be sensed by said sensor when said switch means is in said second mode, and manually operated means for modifying said bridge circuit when said switch means is in said second mode to cause said bridge circuit to provide said gating signal to place said switch means in said one mode of operation.

7. The temperature responsive circuit of claim 6 wherein said manually operated means is only effective when operated with said switch means in said second mode to cause said bridge circuit to provide said gating signal to place said switch means in said one mode, if said sensor is then responding to a temperature which is at least a predetermined number of degrees below said first temperature.

8. The temperature responsive circuit of claim 6 wherein said resistive circuit modifying means includes an electrically energized indicator which is energized when said circuit modifying means is presenting said different magnitude of resisetance in response to said second mode of operation of said switch means.

9. In a temperature responsive control circuit, the combination comprising:

a phase sensitive switch means having an input and output, said switch means having a first and second mode of operation dependent upon the phase and magnitude of a signal applied to said input, an A.C. energized bridge circuit including a temperature responsive resistive sensor, said bridge circuit connected to said switch means and having an output signal which is applied to said switch means input, an electric translating means connected to said switch means output and responsive to said first and second modes of operation of said switch means, a resistive circuit modifying means included in the arms of said bridge circuit and connected to said bridge circuit in response to operation of said translating means in accordance with the first and second modes of operation of said switch means, said circuit modifying means presenting one magnitude of resistance when said translating means is responding to one of said first and second modes causing said bridge circuit to provide an output signal of the proper phase and magnitude to maintain said switch means in said one mode so long as the temperature sensed by said sensor remains below a first temperature and presenting another magnitude of resistance when said translating means is responding to the other of said first and second modes causing said bridge circuit to provide an output signal of the proper phase and magnitude to maintain said switch means in said other modes so long as the temperature sensed by said sensor remains above a second temperature, said second temperature being less than any temperature expected to be sensed by said sensor when said switch means is in said other mode, and manually operated means for modifying said bridge circuit when said switch means is in said other mode to cause said bridge circuit to provide an output signal of the proper phase and magnitude to place said switch means in said one mode of operation.

10. In a temperature responsive control circuit, the combination comprising:

a phase sensitive switch means having an input and output, said switch means having an "on" mode and an "off" mode of operation dependent upon the phase and magnitude of a signal applied to said input, an A.C. energized bridge circuit including a temperature responsive resistive sensor, said bridge circuit connected to said switch means and having an output signal which is applied to said switch means input, an electric translating means connected to said switch means output and responsive to said "on" and "off" modes of said switch means, a resistive circuit modifying means included in the arms of said bridge circuit and connected to said bridge circuit in response to operation of said translating means in accordance with the "on" and "off" modes of said switch means, said circuit modifying means presenting one magnitude of resistance when said translating means is responding to said "on" mode causing said bridge circuit to provide an output signal of the proper phase and magnitude to maintain said switch means in the "on" mode so long as the temperature sensed by said sensor remains within a first temperature range and presenting another magnitude of resistance when said translating means in responding to said "off" mode causing said bridge circuit to provide an output signal of the proper phase and magnitude to maintain said switch means in the "off" mode so long as the temperature sensed by said sensor remains within a second temperature range, said second temperature range including all temperatures expected to be sensed by said sensor when said phase sensitive switch means is in said "off" mode, and manually operated means for modifying said bridge circuit when said switch means is in said "off" mode to cause said bridge circuit to provide an output signal of the proper phase and magnitude to place said switch means in said "on" mode of operation.

11. Apparatus for governing the energization of a winding in an electric motor in response to the temperature at said winding, the combination comprising:

a phase sensitive switch means having an input and output, said switch means having an "on" and "off" mode of operation dependent upon the phase and magnitude of a signal applied to said input;

control means connected to permit energization of the motor winding in response to said "on" mode of operation of said switch means and to prevent energization of the motor winding in response to said "off" mode of operation of said switch means;

an A.C. bridge network having an output signal applied to said switch means input, said network including a first bridge circuit connected to said switch means in response to said "on" mode of operation of said switch means and a second bridge circuit connected to said switch means in response to said "off" mode of operation of said switch means;

a temperature responsive sensor common to said first and second bridge circuits and positioned in the winding of the motor to respond to the temperature thereof, causing the output signal of said network to change in accordance with the temperature at the winding of the motor, said sensor upon sensing a first temperature when said first bridge circuit is connected to said switch means causes said network to provide an output signal of the proper phase and magnitude to cause said switch means to change from said "on" mode to said "off" mode thereby conditioning said control means to prevent energization of the winding of the motor and said sensor upon sensing a second temperature when said second bridge is connected to said switch means causes said network to provide an output signal of the proper phase and magnitude to cause said switch means to change from said "off" mode to said "on" mode, said second temperature being below said first temperature and below any temperature expected to be encountered by said sensor when said switch means is in said "off" mode, and manually operated means for modifying said bridge network when said switch means is in said "off" mode causing said bridge network to provide an output signal of the proper phase and magnitude to place said switch means in said "on" mode thereby conditioning said control means to permit energization of the winding of the motor.

12. The apparatus of claim 11 wherein said bridge network modified by said manually operated means requires said sensor to be sensing a temperature which is at least a predetermined number of degrees below said first temperature to provide an output signal of the proper phase and magnitude to place said switch means in said "on" mode.

13. Apparatus for governing the energization of a winding in an electric motor in response to the temperature at said winding, the combination comprising:

a phase sensitive switch means having an input and output, said switch means having an "on" and "off" mode of operation dependent upon the phase and magnitude of a signal applied to said input;

control means connected to permit energization of the motor winding in response to said "on" mode of operation of said switch means and to prevent energization of the motor winding in response to said "off" mode of operation of said switch means;

an A.C. bridge network having an output signal applied to said switch means input, said network including a first bridge circuit connected to said switch means in response to said "on" mode of operation of said switch means and a second bridge circuit connected to said switch means in response to said "off" mode of operation of said switch means;

a temperature responsive sensor common to said first and second bridge circuits and positioned in the winding of the motor to respond to the temperature thereof, causing the output signal of said network to change in accordance with the temperature at the winding of the motor, said sensor upon sensing a first temperature when said first bridge circuit is connected to said switch means causes said network to provide an output signal of the proper phase and magnitude to cause said switch means to change from said "on" mode to said "off" mode thereby conditioning said control means to prevent energization of the winding of the motor and said sensor upon sensing a second temperature when said second bridge is connected to said switch means causes said network to provide an output signal of the proper phase and magnitude to cause said switch means to change from said "off" mode to said "on" mode, said second temperature being below said first temperature and below any temperature expected to be encountered by said sensor when said switch means is in said "off" mode, and manually operated means for momentarily connecting said first bridge circuit to said switch means when said switch means is in said "off" mode, said first bridge circuit causing said bridge network to have an output signal of the proper phase and magnitude to place said switch means in said "on" mode provided the temperature sensed by said sensor is below said first temperature.

14. Apparatus for governing the energization of a winding in an electric motor in response to the temperature at said winding, the combination comprising:

a phase sensitive switch means having an input and output, said switch means having an "on" and "off" mode of operation dependent upon the phase and magnitude of a signal applied to said input;

control means connected to permit energization of the motor winding in response to said "on" mode of operation of said switch means and to prevent energization of the motor winding in response to said "off" mode of operation of said switch means;

an A.C. bridge network having an output signal applied to said switch means input, said network including a first bridge circuit connected to said switch means in response to said "on" mode of operation of said switch means and a second bridge circuit connected to said switch means in response to said "off" mode of operation of said switch means;

a temperature responsive sensor common to said first and second bridge circuits and positioned in the winding of the motor to respond to the temperature thereof, causing the output signal of said network to change in accordance with the temperature at the winding of the motor, said sensor upon sensing a first temperature when said first bridge circuit is connected to said switch means causes said network to provide an output signal of the proper phase and magnitude to cause said switch means to change from said "on" mode to said "off" mode thereby conditioning said control means to prevent energization of the winding of the motor and said sensor upon sensing a second temperature when said second bridge is connected to said switch means causes said network to provide an output signal of the proper phase and magnitude to cause said switch means to change from said "off" mode to said "on" mode, said second temperature being below said first temperature and below any temperature expected to be encountered by said sensor when said switch means is in said "off" mode, and manually operated means for momentarily modifying said second bridge circuit when said switch means is in said "off" mode to present a third bridge circuit including said sensor causing said bridge network to have an output signal of the proper phase and magnitude to place said switch means in said "on" mode provided the temperature sensed by said sensor is at least a predetermined number of degrees below said first temperature.

15. Apparatus for governing the energization of a winding in an electric motor in response to the temperature at said winding, the combination comprising:

a phase sensitive switch means having an input and output, said switch means having an "on" and "off" mode of operation dependent upon the phase and magnitude of a signal applied to said input, said phase sensitive switch means including first electrical contacts having a first position and a second position and second electrical contacts having a first position and a second position, said first electrical contacts and second electrical contacts assuming their respective first and second positions in response to said "on" and "off" modes of operation, respectively, of said switch means;

a motor winding control circuit including said first electrical contacts for controlling the flow of current to the motor winding, said control circuit conditioned by said first position of said first contacts to permit energization of the motor winding and conditioned by said second position of said first contacts to prevent energization of the motor winding;

an A.C. bridge network having an output signal applied to said switch means input, said network including a first bridge circuit connected via said first position of said second electrical contacts to provide said network output signal, a second bridge circuit connected via said second position of said second electrical contacts to provide said network output signal;

a temperature responsive sensor common to said first and second bridge circuits and positioned in the windings of the motor to respond to the temperature thereof, said sensor when said first bridge circuit is connected to provide said network output signal causes said network output signal to be of the proper phase and magnitude to maintain said switch means in said "on" mode of operation so long as the temperature of the motor winding is below a first temperature and upon sensing said first temperature and above causes said network output signal to be of the phase and magnitude to cause said switching means to switch from said "on" mode of operation to said "off" mode of operation whereupon said second position of said second electrical contacts is established to connect said second bridge circuit to provide said network output signal and said second position of said first electrical contacts is established preventing energization of the motor winding, said sensor then causing said network output signal to be of the phase and magnitude to maintain said switch means in said "off" mode of operation so long as the temperature of the motor winding is above a second temperature, said second temperature being below said first temperature and below any temperature expected to be sensed by said sensor when said switch means is in said "off" mode;

and manually operated means for modifying said bridge network when said switch means is in said "off" mode to cause said network output signal to be of the proper phase and magnitude to cause said switching means to switch from said "off" mode of operation to said "on" mode of operation whereupon said first position of said second electrical contacts is established to again connect said first bridge circuit to provide said network output signal and said first position of said first electrical contacts is established to again condition said motor winding control circuit to permit energization of said motor winding.

16. The apparatus of claim 15 wherein said second bridge circuit includes an electrically energized visual indicator which is energized when said second bridge circuit is connected to provide said network output signal.

17. Apparatus for governing the energization of a winding in an electric motor in response to the temperature at said winding, the combination comprising:

a phase sensitive switch means having an input and output, said switch means having an "on" and "off" mode of operation dependent upon the phase and magnitude of a signal applied to said input, said phase sensitive switch means including an electric translating device having a first and second set of contacts, each set having open and closed positions, said contacts positioned in response to operation of said translating device in accordance with the mode of operation of said switch means, a motor winding control circuit including said second set of contacts connected to permit energization of the motor winding when said switch means is in said "on" mode, and to prevent energization of the motor winding when said switch means is in said "off" mode, an A.C. bridge network having an output signal which is applied to said switch means input, said network including a first bridge circuit connected to said switch means via the positioning of said first set of contacts to provide said network output signal when said switch means is in an "on" mode of operation and a second bridge circuit connected to said switch means via the positioning of said first set of contacts to provide said network output signal when said switch means is in said "off" mode of operation, a temperature responsive resistive sensor common to said first and second bridge circuits and positioned in the winding of the motor, said sensor when said first bridge circuit is connected to said switch means causes said network output signal to be of the proper phase and magnitude to cause said switch means to change from said "on" mode to said "off" mode upon sensing a first temperature whereupon said second bridge circuit is connected to said switch means and said set of contacts positioned to prevent energization of the motor winding, said sensor then causing said network output signal to be of the proper phase and magnitude to cause said switch means to change from said "off" mode to said "on" mode only after the temperature sensed has dropped to a lower second temperature, said second temperature being outside of the temperature range to which said sensor is expected to encounter, and manually operated means for modifying said bridge network to cause said network output to be of the proper phase and magnitude to cause said switching means to switch from said "off" mode to said "on" mode whereby said first bridge circuit is again connected to said switch means and said second set of contacts positioned to permit energization of the motor winding.

18. Apparatus for governing the energization of a winding in an electric motor in response to the temperature at said winding, the combination comprising:

a phase sensitive switch means having an input and output, said switch means having an "on" and "off" mode of operation dependent upon the phase and magnitude of a signal applied to said input, said phase sensitive switch means including an electric translating device having a first and second set of contacts, each set having open and closed positions, said contacts positioned in response to operation of said translating device in accordance with the mode of operation of said switch means, a motor winding control circuit including said second set of contacts connected to permit energization of the motor winding when said switch means is in said "on" mode, and to prevent energization of the motor winding when said switch means is in said "off" mode, an A.C. bridge network having an output signal which is applied to said switch means input, said network including a first bridge circuit connected to said switch means via the positioning of said first set of contacts to provide said network output signal when said switch means is in an "on" mode of operation and a second bridge circuit connected to said switch means via the positioning of said first set of contacts to provide said network output signal when said switch means is in said "off" mode of operation, a temperature responsive resistive sensor common to said first and second bridge circuits and positioned in the winding of the motor, said sensor when said first bridge circuit is connected to said switch means causes said network output signal to be of the proper phase and magnitude to cause said switch means to change from said "on" mode to said "off" mode upon sensing a first temperature whereupon said second bridge circuit is connected to said switch means and said set of contacts positioned to prevent energization of the motor winding, said sensor then causing said network output signal to be of the proper phase and magnitude to cause said switch means to change from said "off" mode to said "on" mode only after the temperature sensed has dropped to a lower second temperature, said second temperature being outside of the temperature range to which said sensor is expected to encounter, and manually operated means for momentarily connecting a third bridge circuit including said sensor to provide said network output signal which, if the temperature sensed by said sensor is at least a predetermined number of degrees below said first temperature, will be of the proper phase and magnitude to cause said switching means to switch from said "off" mode to said "on" mode causing said first set of contacts to be positioned to again connect said first bridge circuit to said switch means and causing said second set of contacts to be positioned to permit energization of the motor winding.

References Cited

UNITED STATES PATENTS

| | | |
|---|---|---|
| 3,136,877 | 6/1964 | Heller. |
| 3,159,768 | 12/1964 | Flanagan _____ 317—41 |
| 3,205,405 | 9/1965 | Resh _____ 317—41 |
| 3,247,438 | 4/1966 | Kyle. |
| 3,268,768 | 8/1966 | Milligan et al. _____ 318—473 X |
| 3,321,641 | 5/1967 | Howell _____ 318—473 X |
| 3,329,869 | 7/1967 | Obenhaus _____ 318—473 X |

ORIS L. RADER, *Primary Examiner.*

B. A. COOPER, *Assistant Examiner.*

U.S. Cl. X.R.

317—41, 42, 13; 318—229